US010543582B2

(12) United States Patent
Taura et al.

(10) Patent No.: US 10,543,582 B2
(45) Date of Patent: Jan. 28, 2020

(54) ABRASIVE FILM

(71) Applicant: BANDO CHEMICAL INDUSTRIES, LTD., Kobe-shi, Hyogo (JP)

(72) Inventors: Toshikazu Taura, Kobe (JP); Kazuo Saito, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/324,073

(22) PCT Filed: Jun. 26, 2015

(86) PCT No.: PCT/JP2015/068488
§ 371 (c)(1),
(2) Date: Jan. 5, 2017

(87) PCT Pub. No.: WO2016/006476
PCT Pub. Date: Jan. 14, 2016

(65) Prior Publication Data
US 2017/0157745 A1 Jun. 8, 2017

(30) Foreign Application Priority Data

Jul. 7, 2014 (JP) .................................. 2014-140073

(51) Int. Cl.
*B24D 3/28* (2006.01)
*B24D 11/00* (2006.01)
*B24B 37/24* (2012.01)

(52) U.S. Cl.
CPC ................ *B24D 3/28* (2013.01); *B24B 37/24* (2013.01); *B24D 11/00* (2013.01); *B24D 11/001* (2013.01)

(58) Field of Classification Search
CPC ........ B24D 3/28; B24D 11/00; B24D 11/001; B24B 37/24

(Continued)

(56) References Cited

U.S. PATENT DOCUMENTS 5,667,842 A * 9/1997 Larson .................... B24D 3/28
427/258
8,628,383 B2 * 1/2014 Starling ................. B24D 11/00
451/526

(Continued)

FOREIGN PATENT DOCUMENTS

EP 0231397 A1 8/1987
JP 62-34762 A 2/1987

(Continued)

OTHER PUBLICATIONS

International Search Report dated Sep. 15, 2015, issued in counterpart International Application No. PCT/JP2015/068488 (2 pages).

(Continued)

*Primary Examiner* — Eileen P Morgan
(74) *Attorney, Agent, or Firm* — Westerman, Hattori, Daniels & Adrian, LLP

(57) ABSTRACT

An abrasive film capable of preventing an undercut of an optical fiber after polishing, while providing a great grinding force is provided. An abrasive film includes a substrate and an abrasive layer overlaid on a top face side thereof, the abrasive layer including a resin binder and abrasive particles dispersed in the resin binder; the content of abrasive particles having a primary particle size of no less than 70 nm being no less than 10% by mass and no greater than 50% by mass with respect to the total abrasive particles; the content of the abrasive particles in the abrasive layer being no less than 84% by mass; and the indentation hardness of the abrasive layer being no greater than 370 N/mm². The abrasive particles are preferably silica particles. An average thickness of the abrasive layer is preferably no less than 4 μm and no greater than 15 μm.

5 Claims, 2 Drawing Sheets

(58) Field of Classification Search
USPC .................. 451/530, 533; 51/295, 298, 302
See application file for complete search history.

(56) References Cited

U.S. PATENT DOCUMENTS

| | | | |
|---|---|---|---|
| 9,931,733 B2* | 4/2018 | Manning | B24B 1/00 |
| 2003/0171078 A1 | 9/2003 | Ryoke et al. | |
| 2004/0005460 A1* | 1/2004 | Yamazaki | B24B 19/226 |
| | | | 428/404 |
| 2004/0048057 A1* | 3/2004 | Kendall | B24D 3/002 |
| | | | 428/323 |
| 2010/0107509 A1* | 5/2010 | Guiselin | B24D 3/00 |
| | | | 51/298 |
| 2010/0159805 A1* | 6/2010 | Goldsmith | B24B 7/182 |
| | | | 451/28 |
| 2012/0167478 A1* | 7/2012 | Herbert | B24D 3/28 |
| | | | 51/295 |
| 2012/0192500 A1* | 8/2012 | Wang | C09K 3/1463 |
| | | | 51/303 |
| 2013/0095731 A1* | 4/2013 | Manning | B24B 1/00 |
| | | | 451/28 |
| 2013/0283702 A1* | 10/2013 | Manning | B24B 13/01 |
| | | | 51/298 |
| 2013/0298471 A1* | 11/2013 | Cai | B24D 3/28 |
| | | | 51/295 |
| 2016/0000292 A1* | 1/2016 | Calderas | A47L 13/16 |
| | | | 15/229.12 |
| 2017/0008143 A1* | 1/2017 | Minami | B24B 37/26 |

FOREIGN PATENT DOCUMENTS

| | | |
|---|---|---|
| JP | 8-336758 A | 12/1996 |
| JP | 2002-239924 A | 8/2002 |
| JP | 2003-260648 A | 9/2003 |
| JP | 2004-249370 A | 9/2004 |
| JP | 2007-190613 A | 8/2007 |
| JP | 2010-274348 A | 12/2010 |
| WO | WO2013094052 * | 6/2013 |

OTHER PUBLICATIONS

Extended (supplementary) European Search Report dated Jul. 24, 2018, issued in counterpart European Application No. 15819449.8. (8 pages).

* cited by examiner

ABRASIVE FILM

TECHNICAL FIELD

The present invention relates to an abrasive film.

BACKGROUND ART

In optical fiber communication networks, easily detachable connectors are widely used for connection between optical fibers. The connection is provided by butting ferrules, which are used for positioning of the optical fibers, directly against each other. Given this, in order to reduce optical loss (communication loss) from the optical fiber after the connection, a connection end face of the optical fiber connector to be connected is required to have a sufficiently smooth surface and not to generate a gap between optical fibers at the connection end faces (not to have an undercut of the optical fiber with respect to the ferrule).

Polishing of such a connection end face of an optical fiber is performed in four steps of: removal of an adhesive; rough polishing of a spherical surface; intermediate finishing; and finish polishing. Of these, polishing accuracy of the step of finish polishing largely influences the optical loss. Furthermore, in light of productivity and production cost, an abrasive film used in the step of finish polishing is required to have a great grinding force.

As such an abrasive film, an abrasive film has been proposed having an abrasive layer containing a resin binder and abrasive particles. In order to meet these needs, attempts have been made such as selection of a type of the resin binder and of the abrasive particles, as well as increase in particle size of the abrasive particles (refer to Japanese Unexamined Patent Application, Publication Nos. H8-336758, 2002-239924, and 2007-190613).

However, using particles having a larger particle size as the abrasive particles in the abrasive film in order to obtain a great grinding force results in selective polishing of the optical fiber and makes it difficult to prevent an undercut of the optical fiber and to make the optical fiber to protrude from the ferrule, and a gap is more likely to be generated between the optical fibers at the connection end faces. Given this, in the Prior Art, the increased grinding force and prevention of an undercut of an optical fiber are not sufficiently concomitantly provided.

PRIOR ART DOCUMENTS

Patent Documents

Patent Document 1: Japanese Unexamined Patent Application, Publication No. H8-336758
Patent Document 2: Japanese Unexamined Patent Application, Publication No. 2002-239924
Patent Document 3: Japanese Unexamined Patent Application, Publication No. 2007-190613

SUMMARY OF THE INVENTION

Problems to be Solved by the Invention

The present invention has been made in view of the aforementioned situation, and an object of the invention is to provide an abrasive film that is capable of preventing an undercut of an optical fiber after polishing, while providing a great grinding force.

Means for Solving the Problems

As a result of a thorough investigation, the present inventors have obtained a knowledge that an undercut of an optical fiber can be inhibited by controlling an indentation hardness of the abrasive layer and the content of abrasive particles having a large primary particle size. Accordingly, the present inventors have found that an abrasive film can be obtained that is capable of preventing an undercut of an optical fiber while employing the abrasive particles having a large primary particle size, leading to completion of the present invention.

More specifically, the present invention was made for solving the aforementioned problems, and according to an aspect of the present invention, an abrasive film includes a substrate and an abrasive layer that is overlaid on a top face side thereof, the abrasive layer including a resin binder and abrasive particles dispersed in the resin binder; the content of the abrasive particles having a primary particle size of no less than 70 nm being no less than 10% by mass and no greater than 50% by mass with respect to the total abrasive particles; the content of the abrasive particles in the abrasive layer being no less than 84% by mass; and the indentation hardness of the abrasive layer being no greater than 370 $N/mm^2$.

Since the indentation hardness of the abrasive layer is no greater than the above-defined upper limit and the content of abrasive particles having a primary particle size of no less than 70 nm with respect to the total abrasive particles is no greater than the above-defined upper limit, the abrasive film is capable of inhibiting an undercut of an optical fiber after polishing. In addition, since the indentation hardness of the abrasive layer is no less than the above-defined lower limit and the content of abrasive particles having a primary particle size of no less than 70 nm with respect to the total abrasive particles is no less than the above-defined lower limit, the abrasive film has a great grinding force.

The abrasive particles are preferably silica particles. Since silica particles are abrasive particles that are suitable for use in a final finishing step in which a low surface roughness is required for a connection end face of the optical fiber connector, employing silica particles having a large primary particle size enables a great grinding force to be provided while maintaining polishing accuracy.

An average thickness of the abrasive layer is preferably no less than 4 μm and no greater than 15 μm. By thus defining the average thickness of the abrasive layer to fall within the above-defined range, a low level of the indentation hardness of the abrasive layer can be maintained, an undercut of an optical fiber can further easily be prevented, and wear resistance of the abrasive layer can be improved.

The resin binder preferably contains an elastomer having a glass transition temperature of no greater than 20° C., and the content of the elastomer in the resin binder is preferably no less than 20% by mass. By thus defining the content of the elastomer having a glass transition temperature of no greater than 20° C. in the resin binder to be no less than the above-defined lower limit, the indentation hardness of the abrasive layer can be easily controlled.

The term "indentation hardness" as referred to means a value obtained in accordance with ISO-14577-1. In addition, the term "primary particle" as referred to means a particle that may be considered as a unit particle from a geometric configuration thereof, the term "primary particle size" as referred to means a diameter of a particle measured by using an image of the particle observed by way of a scanning electron microscope (SEM) or a transmission electron microscope (TEM), and "diameter of a particle" as referred to means a diameter of a minimum circle circumscribed to an image of the particle.

Effects of the Invention

As explained in the foregoing, the abrasive film according to the present invention can prevent an undercut of an optical fiber after polishing, while providing a great grinding force. Therefore, the abrasive film can be suitably used in, for example, a finishing step of a connection end face of an optical fiber connector.

DESCRIPTION OF EMBODIMENTS

Embodiments of the present invention will be described in detail hereinafter with reference to the drawings as necessary.

Abrasive Film

Figure 1:
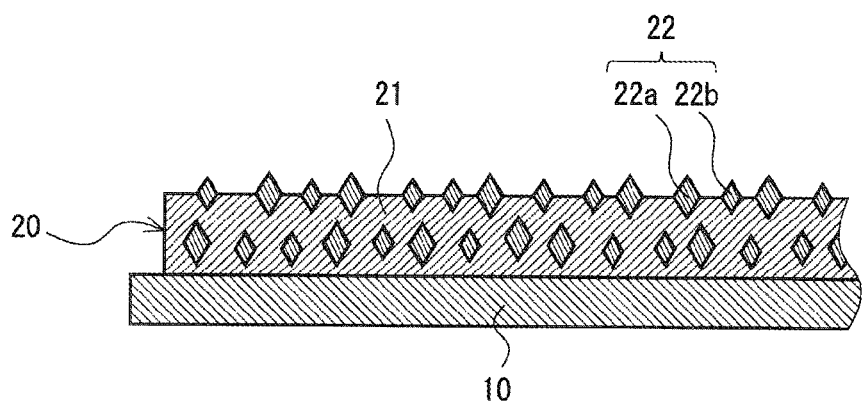
FIG. 1 is a schematic end view of an abrasive film according to an embodiment of the present invention.

The abrasive film illustrated in FIG. 1 includes a sheet-shaped substrate 10 and an adhesive layer 20 that is overlaid on a top face thereof.

(Substrate)

Although a material for the substrate is not particularly limited, a material that has appropriate rigidity and ensures favorable adhesiveness and cohesiveness to the abrasive layer 20 is preferred. As such a material, a well-known thermoplastic resin may be employed that is exemplified by an acrylic resin, polycarbonate, polyethylene terephthalate (PET), polypropylene (PP), polyethylene (PE), and the like. As the substrate 10, a biaxially stretched film of PET, PP, PE, or the like may also be employed. Furthermore, a surface of the substrate 10 may be subjected to a treatment for increasing adhesiveness such as a chemical treatment, corona treatment, primer treatment and the like.

Although a planar shape and a size of the substrate 10 are not particularly limited, the planar shape and the size may be, for example, a square shape of 127 mm×127 mm and a circular shape of 127 mm in diameter. Alternatively, a configuration in which a plurality of substrates 10 aligned on a planar surface are supported by a single support may also be employed.

Although an average thickness of the substrate 10 is not particularly limited, the average thickness may be, for example, no less than 30 µm and no greater than 150 µm. When the average thickness of the substrate 10 is less than the above-defined lower limit, strength and flatness of the abrasive film may be insufficient. On the other hand, when the average thickness of the substrate 10 is greater than the above-defined upper limit, the abrasive film may be unnecessarily thick and thus difficult to handle.

(Abrasive Layer)

The abrasive layer 20 is overlaid on a surface of the substrate 10 and contains a resin binder 21 and abrasive particles 22 dispersed in the resin binder 21.

The lower limit of the average thickness of the abrasive layer 20 is preferably 4 µm, and more preferably 5 µm. In addition, the upper limit of the average thickness of the abrasive layer 20 is preferably 15 µm, and more preferably 12 µm. When the average thickness of the abrasive layer 20 is less than the lower limit, abrasion resistance of the abrasive film may be insufficient. On the other hand, when the average thickness of the abrasive layer 20 is greater than the upper limit, control of an undercut amount of an optical fiber during polishing may be difficult.

The upper limit of the indentation hardness of the abrasive layer 20 is 370 N/mm$^2$ and more preferably 350 N/mm$^2$. In addition, the lower limit of the indentation hardness of the abrasive layer 20 is preferably 250 N/mm$^2$ and more preferably 280 N/mm$^2$. When the indentation hardness of the abrasive layer 20 is greater than the upper limit, an optical fiber may be selectively polished during polishing, resulting in an undercut of the optical fiber with respect to a ferrule. On the other hand, when the indentation hardness of the abrasive layer 20 is less than the lower limit, the grinding force of the abrasive film may be insufficient.

An influence of the indentation hardness of the abrasive layer 20 on an undercut of an optical fiber will now be discussed. Polishing of a connection end face of an optical fiber connector is performed by pressing the connection end face of the optical fiber connector against the abrasive film adhered to an elastic material pad while applying a load. In a case in which the indentation hardness of the abrasive layer 20 is high, it is expected that polishing pressure is high in the vicinity of a vertex of the optical fiber connector that has been spherically formed, whereby the optical fiber in the vicinity of the vertex of the optical fiber connector is selectively polished, and thus an undercut of the optical fiber with respect to a ferrule would occur. Given this, by lowering the indentation hardness of the abrasive layer 20, followability of the abrasive layer 20 to the elastic material pad is expected to increase, and therefore, stable and accurate control of an undercut of the optical fiber is expected to be realized.

On the basis of the above discussion, the present inventors conducted the following test to determine an optimum range of the indentation hardness of the abrasive layer 20 permitting stable and accurate control of an undercut of an optical fiber while maintaining a great grinding force. First, as an abrasive film having a great grinding force, five types of abrasive films were provided in which the content of the abrasive particles 22 having a primary particle size of no less than 70 nm was no less than 10% by mass and no greater than 50% by mass with respect to the total abrasive particles 22, and the content of the abrasive particles 22 in the abrasive layer 20 was no less than 84% by mass. The indentation hardness of these abrasive films was measured by using a nano-indentation hardness tester ("ENT-1100a" available from Elionix Inc.). Next, the abrasive film was punched to give a circular shape of 127 mm in diameter and adhesively fixed onto an elastic material pad (hardness: 70°) of a polishing machine ("SFP-550S" available from Seikoh Giken Co. Ltd.). A connection end face of an optical fiber connector, having been subjected to intermediate finish polishing, was subjected to final finish polishing for 60 sec at a rotation rate of 1 rpm and a revolution rate of 70 rpm, with ion exchanged water as a polishing liquid. Thereafter, an undercut amount of the optical fiber connector thus polished was measured by using a 3D fiber optic connector end face geometry measurement apparatus ("ACCIS NC/AC-3000" (Automated Non-Contact Interferometer System), available from Norland Products, INC.). It is to be noted that in a case in which the optical fiber protrudes with respect to the ferrule, the undercut amount is represented by a negative value.

Figure 2:
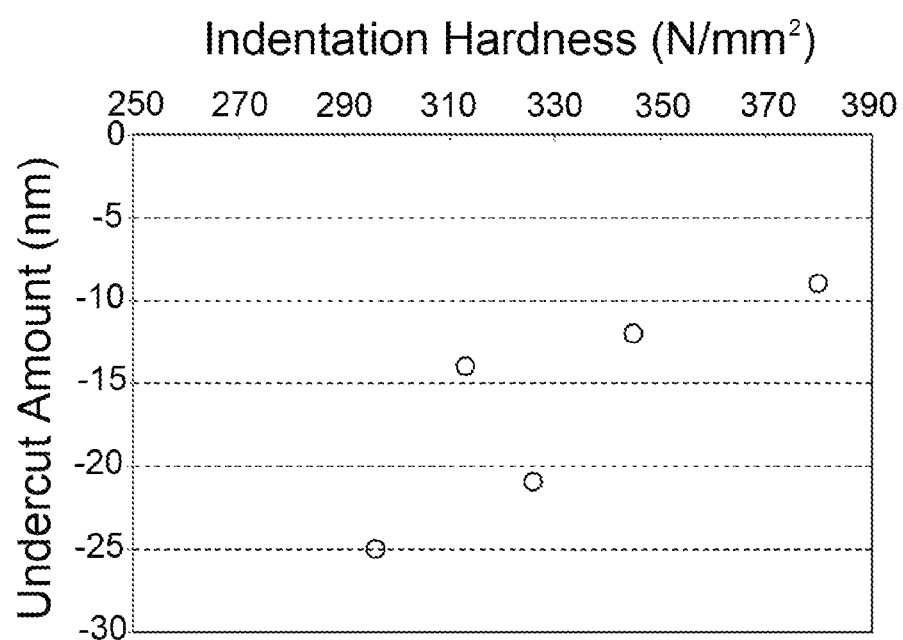
FIG. 2 shows a graph indicating a relationship between an indentation hardness of an abrasive film, and an undercut amount of a polished optical fiber connector.

Based on the results of the measurement, a relationship was obtained between the indentation hardness of the abrasive film and the undercut amount of the optical fiber connector having been polished. The results are shown in FIG. 2. FIG. 2 reveals that the undercut amount of the optical connector is correlated with the indentation hardness of the abrasive film. In addition, the indentation hardness of the abrasive film of no greater than 370 N/mm$^2$ can make the undercut amount of an optical fiber no greater than −10 nm. Since a preferred undercut amount in light of the optical loss is no less than −30 nm and no greater than −10 nm, the indentation hardness of the abrasive film of no greater than 370 N/mm$^2$ is expected to permit stable and accurate control of an undercut of an optical fiber while providing a great grinding force.

(Resin Binder)

A resin or an elastomer may be used as a principal component of the resin binder 21. The resin may be exemplified by an acrylic resin, an epoxy resin, a cellulose resin, a polyvinyl, phenoxy resin, a phenol resin, a polyester, and the like. The elastomer may be exemplified by: a thermoplastic elastomer such as a styrene-based elastomer, an olefin-based elastomer, an ester-based elastomer, a urethane-based elastomer, an amide-based elastomer, a polyvinyl chloride (PVC)-based elastomer, and a fluorine-based elastomer; a natural rubber; a styrene-butadiene rubber; an isoprene rubber; a butadiene rubber; a chloroprene rubber; an acrylonitrile-butadiene rubber; a butyl rubber; an ethylene-propylene rubber; an ethylene-propylene-diene rubber; an acrylic rubber; a silicone rubber; and the like. In a case in which a resin is used as the principal component, an acrylic resin, an epoxy resin and polyester, which are likely to provide favorable dispersibility of the abrasive particles 22 and favorable adhesiveness to the substrate 10, are preferred. In a case in which an elastomer is used as the principal component, in light of adhesiveness to the substrate 10 and handleability, a urethane-based thermoplastic elastomer, an amide-based thermoplastic elastomer, an acrylonitrile-butadiene rubber, a urethane rubber, and an acrylic rubber are preferred. Furthermore, the resin may be at least partially crosslinked, and may contain a curing agent such as polyisocyanate and acrylate. The term "principal component" as referred to means a component which is of the highest content, for example a component of which content is no less than 50% by mass.

The resin binder 21 may contain various types of auxiliary agent, additive and the like ad libitum, such as a resin other than the principal component, a crosslinking agent, a dispersant, a coupling agent, a surfactant, a lubricant, a defoaming agent, a colorant, and the like according to a purpose.

In addition, in a case in which the principal component of the resin binder 21 is a resin, it is preferred that the resin binder 21 further contains an elastomer. The resin binder 21 thus containing an elastomer can lower the indentation hardness of the abrasive layer 20.

In a case in which the resin binder 21 contains an elastomer, the upper limit of the glass transition temperature of the elastomer is preferably 20° C. and more preferably 15° C. When the glass transition temperature of the elastomer is greater than the upper limit, the elastomer may be vitrified during polishing of the optical fiber connector, resulting in hardening of the abrasive layer 20.

As the elastomer, the same ones as the elastomers exemplified for use as the principal component may be used.

The lower limit of the content of the elastomer with respect to the resin binder 21 is preferably 20% by mass and more preferably 30% by mass. Whereas, the upper limit of the content of the elastomer with respect to the resin binder 21 is preferably 75% by mass and more preferably 50% by mass. When the content of the elastomer with respect to the resin binder 21 is less than the lower limit, control of the indentation hardness of the abrasive layer 20 may be difficult. On the other hand, when the content of the elastomer with respect to the resin binder 21 is greater than the upper limit, dispersibility of the abrasive particles 22 in the resin binder 21 may be insufficient.

(Abrasive Particle)

The abrasive particles 22 are exemplified by particles of diamond, alumina, silica and the like. Of these, silica particles providing a great grinding force are preferred. As the silica particles, for example, particles of well-known silica such as colloidal silica, dry silica, wet silica, fused silica may be used. As used herein, "colloidal silica" may include organosilica sol in which colloidal silica is dispersed in an organic solvent.

The abrasive particles 22 include abrasive particles having a primary particle size of no less than 70 nm (large diameter abrasive particles 22a) and abrasive particles having a primary particle size of less than 70 nm (small diameter abrasive particles 22b). By virtue of the large diameter abrasive particles 22a included in the abrasive particles 22, the abrasive film has a great grinding force. In addition, by virtue of the small diameter abrasive particles 22b included in the abrasive particles 22, the abrasive film provides high polishing accuracy.

The distribution curve of the primary particle size of the abrasive particles 22 preferably has two peaks: in a range of less than 70 nm; and in a range of no less than 70 nm. With such a distribution of the primary particle size, the abrasive film can easily and certainly provide: high polishing accuracy by virtue of the small diameter abrasive particles 22b; and a great grinding force by virtue of the large diameter abrasive particles 22a.

The lower limit of a minimum value of the primary particle size of the abrasive particles 22 is preferably 1 nm, and more preferably 10 nm. Meanwhile, the upper limit of a maximum value of the primary particle size of the abrasive particles 22 is preferably 400 nm, and more preferably 300 nm. When the minimum value of the primary particle size of the abrasive particles 22 is less than the lower limit, a polishing time period of a connection end face of an optical fiber connector may be increased. On the other hand, when the maximum value of the primary particle size of the abrasive particles 22 is greater than the upper limit, control of an undercut of an optical fiber during polishing may be difficult.

The lower limit of the content of the large diameter abrasive particles 22a with respect to the total abrasive particles 22 is 10% by mass and more preferably 25% by mass. Whereas, the upper limit of the content of the large diameter abrasive particles 22a with respect to the total abrasive particles 22 is 50% by mass and more preferably 35% by mass. When the content of the large diameter abrasive particles 22a with respect to the total abrasive particles 22 is less than the lower limit, the grinding force of the abrasive film may be insufficient. On the other hand, when the content of the large diameter abrasive particles 22a with respect to the total abrasive particles 22 is greater than the upper limit, control of an undercut amount of an optical fiber during polishing may be difficult.

The lower limit of the content of the abrasive particles 22 in the abrasive layer 20 is 84% by mass and more preferably 87% by mass. Whereas, the upper limit of the content of the abrasive particles 22 in the abrasive layer 20 is preferably 92% by mass and more preferably 90% by mass. When the content of the abrasive particles 22 in the abrasive layer 20 is less than the lower limit, the grinding force of the abrasive film may be insufficient. On the other hand, when the content of the abrasive particles 22 in the abrasive layer 20 is greater than the upper limit, control of the indentation hardness of the abrasive layer 20 may be difficult.

Production Method of Abrasive Film

As the production method of the abrasive film, a well-known technique for production of a thin film can be employed that can secure sufficient adhesiveness and cohesiveness between the substrate 10 and the adhesive layer 20. The production method of the abrasive film includes steps of, for example: preparing a coating liquid; applying the coating liquid onto a surface of the substrate 10; and drying the coating liquid thus applied.

First, in the step of preparing a coating liquid, a solution in which the resin binder 21 and the abrasive particles 22 are dispersed in a solvent is prepared as the coating liquid. The solution is not particularly limited as long as the resin binder 21 is soluble therein. Specifically, methyl ethyl ketone (MEK), isophorone, terpineol, N-methylpyrrolidone, cyclohexanone, propylene carbonate and the like may be used. A diluent etc. such as water, alcohol, ketone, an acetic acid ester, and an aromatic compound may be added in order to adjust the viscosity and fluidity of the coating liquid. In addition, various types of auxiliary agent and additive may be mixed therewith.

Next, in the step of applying the coating liquid, the coating liquid prepared in the step of preparing the coating liquid is applied onto a surface of the substrate 10. A procedure for the applying is not particularly limited, and a well-known procedure for applying, for example, bar coating, comma coating, spray coating, reverse roll coating, knife coating, screen printing, gravure coating, die coating and the like can be employed.

Subsequently, in the step of drying, the abrasive layer 20 is formed by drying and hardening by a reaction in the coating liquid thus applied. Specifically, for example, hot air of no lower than 90° C. and no higher than 110° C. is applied to the substrate 10 for no less than 20 hrs to evaporate the solvent in the coating liquid while curing a solute, thereby forming the abrasive layer 20.

Advantages

Since the indentation hardness of the abrasive layer 20 is no greater than 370 N/mm$^2$ and the content of large diameter abrasive particles 22a having a primary particle size of no less than 70 nm with respect to the total abrasive particles 22 is no greater than 50% by mass, the abrasive film can prevent an undercut of an optical fiber after polishing. In addition, since the content of the large diameter abrasive particles 22a with respect to the total abrasive particles is no less than 10% by mass and the content of the abrasive particles 22 in the abrasive layer is no less than 84% by mass, the abrasive film has a great grinding force.

Other Embodiments

The present invention is not limited to the aforementioned embodiment, and, in addition to the aforementioned embodiment, can be carried out in various modes with alterations and/or improvements being made.

Although in the aforementioned embodiment, the abrasive film in which the abrasive layer is formed directly on a surface of the substrate has been described, a primer-treated layer for ensuring adhesiveness between the substrate and the abrasive layer may be provided between the substrate and the abrasive layer. A principal component of the primer-treated layer is not particularly limited as long as adhesiveness between the substrate and the abrasive layer can be ensured, and for example a water soluble or water dispersible polyester or acrylic resin; a resin in which an unsaturated bond-containing compound is grafted to a water soluble or water dispersible hydrophilic group-containing polyester; and the like may be used.

The primer-treated layer can be formed by, for example, spray-coating a primer agent containing the principal component onto a surface of the substrate and then drying. Alternatively, a substrate having a primer-treated layer provided beforehand on a surface thereof may also be used.

In addition, the abrasive layer may have a groove. A geometry of the groove may be, for example, an equally spaced grid geometry, or a stripe geometry in which a plurality of linear grooves are arranged in a substantially parallel manner. When the abrasive layer has a groove, polishing waste etc. generated during polishing can be efficiently removed.

EXAMPLES

Hereinafter, the present invention will be explained in more detail by way of Examples and Comparative Examples, but the present invention is not limited to the following Examples.

Example 1

A coating liquid was obtained by mixing: 250 parts by mass of organosilica sol ("MEK-ST" available from Nissan Chemical Industries, Ltd., primary particle size: 10 to 20 nm, solid content: 30% by mass) as the small diameter abrasive particles; 10 parts by mass of fused silica ("UFP-30" available from Denki Kagaku Kogyo K.K., average primary particle size: 99 nm) as the large diameter abrasive particles; 220 parts by mass of a tetrahydrofuran solution containing 5% by mass of a crosslinked urethane-based thermoplastic elastomer ("KURAMIRON U9180" available from Kuraray Co., Ltd.) as the resin binder; 5 parts by mass of polyisocyanate ("Desmodur L75C" available from Sumika Bayer Urethane Co., Ltd., solid content: 75% by mass) as the resin binder; and 33 parts by mass of methyl ethyl ketone as the solvent.

The coating liquid was applied onto one surface of a polyester film ("Lumirror T91N" available from Toray Industries, Inc., average thickness: 75 μm) as the substrate by the bar coating procedure, and dried in an oven at 100° C., whereby an abrasive film having an abrasive layer having an average thickness of 5 μm was obtained. The content of the abrasive particles in the abrasive layer is 85% by mass.

Example 2

A coating liquid was obtained by mixing: 207 parts by mass of organosilica sol ("MEK-ST" available from Nissan Chemical Industries, Ltd., primary particle size: 10 to 20 nm, solid content: 30% by mass) as the small diameter abrasive particles; 87 parts by mass of organosilica sol ("IPA-ST-ZL" available from Nissan Chemical Industries, Ltd., primary particle size: 70 to 100 nm, solid content: 30% by mass) as the large diameter abrasive particles; 60 parts by mass of a N,N-dimethylformamide solution containing 5% by mass of a vulcanized acrylonitrile-butadiene rubber ("N230S" available from JSR Co. Ltd.) as the resin binder; 60 parts by mass of methyl ethyl ketone containing 5% by mass of a cellulose resin ("ETHOCEL 100" available from Nisshin Kasei Co. Ltd.) as the resin binder; and 7 parts by mass of polyisocyanate ("Desmodur L75C" available from Sumika Bayer Urethane Co., Ltd., solid content: 75% by mass) as the resin binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive layer having an average thickness of 6 μm was obtained. The content of the abrasive particles in the abrasive layer is 88% by mass.

Example 3

A coating liquid was obtained by mixing: 210 parts by mass of organosilica sol ("MEK-ST" available from Nissan Chemical Industries, Ltd., primary particle size: 10 to 20 nm, solid content: 30% by mass) as the small diameter abrasive particles; 87 parts by mass of organosilica sol ("IPA-ST-ZL" available from Nissan Chemical Industries, Ltd., primary particle size: 70 to 100 nm, solid content: 30% by mass) as the large diameter abrasive particles; 100 parts by mass of a N,N-dimethylformamide solution containing 5% by mass of vulcanized acrylonitrile-butadiene rubber ("N230S" available from JSR Co. Ltd.) as the resin binder; and 7 parts by mass of polyisocyanate ("Desmodur L75C" available from Sumika Bayer Urethane Co., Ltd., solid content: 75% by mass) as the resin binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive layer having an average thickness of 11 μm was obtained. The content of the abrasive particles in the abrasive layer is 90% by mass.

Example 4

A coating liquid was obtained by mixing: 240 parts by mass of organosilica sol ("IPA-ST" available from Nissan Chemical Industries, Ltd., primary particle size: 10 to 20 nm, solid content: 30% by mass) as the small diameter abrasive particles; 18 parts by mass of wet silica ("SP03F" available from Fuso Chemical Co., Ltd, average primary particle size: 300 nm) as the large diameter abrasive particles; 140 parts by mass of a 2-propanol solution containing 5% by mass of a crosslinked acrylic elastomer ("BR102" available from Mitsubishi Rayon Co., Ltd.) as the resin binder; 4 parts by mass of polyisocyanate ("Desmodur L75C" available from Sumika Bayer Urethane Co., Ltd., solid content: 75% by mass) as the resin binder; and 50 parts by mass of methyl ethyl ketone as the solvent.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive layer having an average thickness of 5 μm was obtained. The content of the abrasive particles in the abrasive layer is 90% by mass.

Comparative Example 1

An abrasive film having an abrasive layer having an average thickness of 5 μm was obtained in a similar manner to Example 1, except that a coating liquid was used in which: the organosilica sol ("MEK-ST" available from Nissan Chemical Industries, Ltd., primary particle size: 10 to 20 nm, solid content: 30% by mass) as the small diameter abrasive particles was in an amount of 175 parts by mass; the fused silica ("UFP-30" available from Denki Kagaku Kogyo K.K., average primary particle size: 99 nm) as the large diameter abrasive particles was in an amount of 7.5 parts by mass; and the resin binder and the solvent were the same as those of Example 1. The content of the abrasive particles in the abrasive layer is 80% by mass.

Comparative Example 2

A coating liquid was obtained by mixing: 267 parts by mass of organosilica sol ("MEK-ST" available from Nissan Chemical Industries, Ltd., primary particle size: 10 to 20 nm, solid content: 30% by mass) as the small diameter abrasive particles; 17 parts by mass of organosilica sol ("IPA-ST-ZL" available from Nissan Chemical Industries, Ltd., primary particle size: 70 to 100 nm, solid content: 30% by mass) as the large diameter abrasive particles; 60 parts by mass of a N,N-dimethylformamide solution containing 5% by mass of an acrylonitrile-butadiene rubber ("N230S" available from JSR Co. Ltd.) as the resin binder; 120 parts by mass of a cellulose resin ("ETHOCEL 100" available from Nisshin Kasei Co. Ltd.) as the resin binder; and 8 parts by mass of polyisocyanate ("Desmodur L75C" available from Sumika Bayer Urethane Co., Ltd., solid content: 75% by mass) as the resin binder.

The coating liquid was applied onto one surface of a polyester film ("HLE-75" available from Teijin DuPont Films Japan Limited, average thickness: 75 μm) as the substrate by the bar coating procedure, and dried in an oven at 100° C., whereby an abrasive film having an abrasive layer having an average thickness of 5 μm was obtained. The content of the abrasive particles in the abrasive layer is 85% by mass.

Comparative Example 3

An abrasive film having an abrasive layer having an average thickness of 5 μm was obtained in a similar manner to Example 3, except that a coating liquid was used in which: the organosilica sol ("MEK-ST" available from Nissan Chemical Industries, Ltd., primary particle size: 10 to 20 nm, solid content: 30% by mass) as the small diameter abrasive particles was in an amount of 147 parts by mass; the organosilica sol ("IPA-ST-ZL") available from Nissan Chemical Industries, Ltd., primary particle size: 70 to 100 nm, solid content: 30% by mass) as the large diameter abrasive particles was in an amount of 153 parts by mass; and the resin binders were the same as those of Example 3. The content of the abrasive particles in the abrasive layer is 90% by mass.

Comparative Example 4

An abrasive film having an abrasive layer having an average thickness of 6 μm was obtained in a similar manner to Example 2, except that a coating liquid was used in which: the methyl ethyl ketone containing 5% by mass of a cellulose resin ("ETHOCEL 100" available from Nisshin Kasei Co. Ltd.) was in an amount of 120 parts by mass; the polyisocyanate ("Desmodur L75C" available from Sumika Bayer Urethane Co., Ltd., solid content: 75% by mass) was in amount of 8 parts by mass as the resin binders; and the abrasive particles were the same as those of Example 2. The content of the abrasive particles in the abrasive layer is 88% by mass.

Polishing Conditions

By using the above-described abrasive films obtained in Examples 1 to 4 and Comparative Examples 1 to 4, an optical fiber connector in which an optical fiber is adhered to a ferrule ("SC ferrule" available from Seikoh Giken Co. Ltd.) was polished. First, the abrasive film was punched to give a circular shape of 127 mm in diameter and adhesively fixed onto an elastic material pad (hardness: 700) of a polishing machine ("SFP-550S" available from Seikoh Giken Co. Ltd.). A connection end face of the optical fiber connector, having been subjected to intermediate finish polishing, was subjected to final finish polishing for 60 sec at a rotation rate of 1 rpm and a revolution rate of 70 rpm, with ion exchanged water as a polishing liquid.

It is to be noted that the intermediate finish polishing was carried out by: adhesively fixing an abrasive film containing diamond abrasive particles having an average primary particle size of 1 μm ("TOPXD105" available from Bando Chemical Co. Ltd.) onto an elastic material pad (hardness: 80°) of a polishing machine ("SFP-550S" available from Seikoh Giken Co. Ltd.); and polishing a connection end face of the optical fiber connector, having been subjected to rough polishing of a spherical surface, for 120 sec at a rotation rate of 1 rpm and a revolution rate of 70 rpm, with ion exchanged water as a polishing liquid.

Evaluation Procedures

The following evaluations were conducted for the polished optical fiber connectors. The results are shown in Table 1.

Undercut Amount

An undercut amount of the polished optical fiber connector was measured by using a 3D fiber optic connector end face geometry measurement apparatus ("ACCIS NC/AC-3000" available from Norland Products, INC.). It is to be noted that in a case in which the optical fiber protrudes with respect to the ferrule, the undercut amount is represented by a negative value. Since a preferred undercut amount is no less than −30 nm and no greater than −10 nm in light of optical loss, measured value was assessed according to the following criteria:

A: undercut amount falling within the range of no less than −30 nm and no greater than −10 nm; and B: undercut amount being out of the range of no less than −30 nm and no greater than −10 nm.

End Face State

An end face state was observed by using "Video Fiber Microscope" available from Westover Scientific, Inc., and assessed according to the following criteria:

A: adhered matter and scratch not being observed and favorable end face obtained; and B: adhered matter and scratch being observed and favorable end face not being obtained.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Proportion in Abrasive Layer (mass %) | Abrasive particles | 85 | 88 | 90 | 90 | 80 | 85 | 90 | 88 |
| | (Small Diameter Abrasive particles) | (75) | (62) | (63) | (72) | (70) | (80) | (44) | (62) |
| | (Large Diameter Abrasive particles) | (10) | (26) | (27) | (18) | (10) | (5) | (46) | (26) |
| | Resin Binder | 15 | 12 | 10 | 10 | 20 | 15 | 10 | 12 |
| | (Elastomer) | (11) | (3) | (5) | (7) | (15) | (3) | (5) | (0) |
| | (Other than Elastomer) | (4) | (9) | (5) | (3) | (5) | (12) | (5) | (12) |
| Proportion in Abrasive particles (mass %) | Large Diameter Abrasive particles | 12 | 30 | 30 | 20 | 13 | 6 | 51 | 30 |
| Proportion in Resin Binder (mass %) | Elastomer | 73 | 25 | 50 | 70 | 75 | 20 | 50 | 0 |
| Abrasive Layer | Average Thickness (μm) | 5 | 6 | 11 | 5 | 5 | 5 | 5 | 6 |
| | Indentation Hardness(N/mm$^2$) | 296 | 313 | 326 | 345 | 290 | 304 | 318 | 380 |
| Result of Polishing of Optical Fiber Connector | Undercut Amount (nm) | −25 | −14 | −21 | −12 | — | — | +10 | −9 |
| | Assessment of Undercut Amount | A | A | A | A | — | — | B | B |
| | End Face State | A | A | A | A | B | B | A | A |

In Table 1, "-" indicates that the measurement was not conducted.

The results shown in Table 1 reveal that, with the abrasive films of Examples 1 to 4, compared with the abrasive films of Comparative Examples 1 to 4, the undercut amount of the optical fiber connector is controlled to fall within the range of no less than −30 nm and no greater than −10 nm, and the end face state is favorable. On the other hand, in Comparative Example 1, since the content of the abrasive particles is less than 84% by mass, the grinding force is supposed to be insufficient, leading to a failure to obtain a favorable end face. In Comparative Example 2, since the content of the large diameter abrasive particles is less than 10% by mass, the grinding force is supposed to be insufficient, leading to a failure to obtain a favorable end face. In addition, in Comparative Example 3, since the content of the large diameter abrasive particles is greater than 50% by mass, control of the undercut amount of the optical fiber failed. Furthermore, in Comparative Example 4, since the indentation hardness of the abrasive layer is greater than 370 N/mm$^2$, the optical fiber is selectively polished during polishing, whereby the undercut amount of the optical fiber is greater than −10 nm. In other words, in the abrasive films of Examples 1 to 4, the content of the abrasive particles having a primary particle size of no less than 70 nm is no less than 10% by mass and no greater than 50% by mass with respect to the total abrasive particles, the content of the abrasive particles in the abrasive layer is no less than 84% by mass, and the indentation hardness of the abrasive layer is no greater than 370 N/mm$^2$, thereby enabling an undercut of the optical fiber after polishing to be prevented.

INDUSTRIAL APPLICABILITY

The abrasive film according to the present invention is capable of preventing an undercut of an optical fiber after polishing, while having a great grinding force. Therefore, the abrasive film can be suitably used in, for example, a finishing step of a connection end face of an optical fiber connector.

EXPLANATION OF THE REFERENCE SYMBOLS

10 Substrate
20 Abrasive layer
21 Resin binder
22 Abrasive particle
22a Large diameter abrasive particle
22b Small diameter abrasive particle

The invention claimed is:

1. An abrasive film, comprising:
a substrate, and
an abrasive layer that is overlaid on a top face side of the substrate,
wherein the abrasive layer comprises a resin binder and abrasive particles dispersed in the resin binder;
wherein a primary particle size of some of the abrasive particles is no less than 70 nm;
wherein a content of the abrasive particles having the primary particle size of no less than 70 nm is no less than 10% by mass and no greater than 50% by mass with respect to total abrasive particles;
wherein a content of all of the abrasive particles in the abrasive layer is not less than 84% by mass; and
wherein the abrasive layer has an indentation hardness not greater than 370 N/mm$^2$.

2. The abrasive film according to claim 1, wherein all of the abrasive particles are silica particles.

3. The abrasive film according to claim 1, wherein an average thickness of the abrasive layer is no less than 4 μm and no greater than 15 μm.

4. The abrasive film according to claim 1, wherein:
the resin binder comprises an elastomer having a glass transition temperature of no greater than 20° C.; and
a content of the elastomer with respect to the resin binder is no less than 20% by mass.

5. The abrasive film according to claim 1, wherein a content of all of the abrasive particles in the abrasive layer is not greater than 92% by mass.

* * * * *